(No Model.)
W. SCHWENDLER.
LEMON SQUEEZER.
No. 497,078. Patented May 9, 1893.
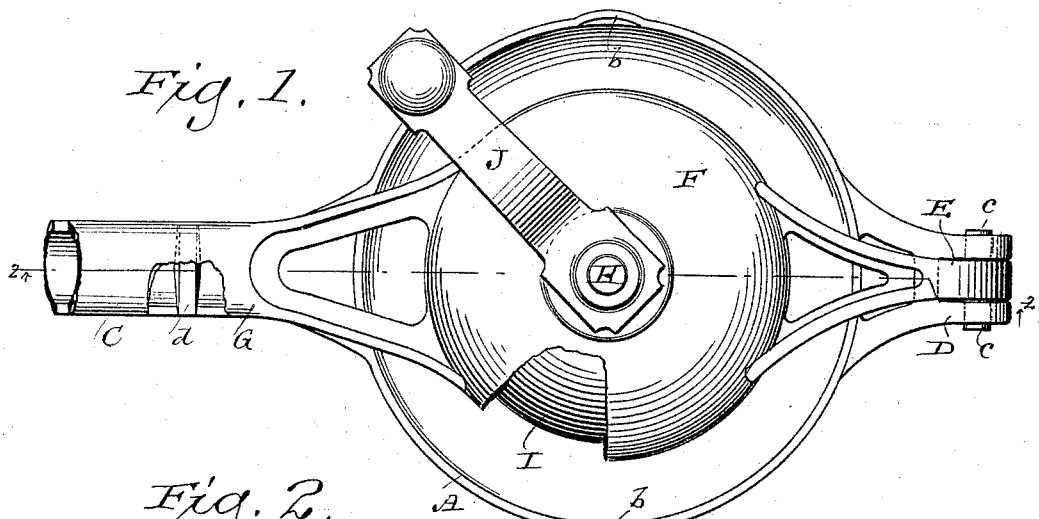
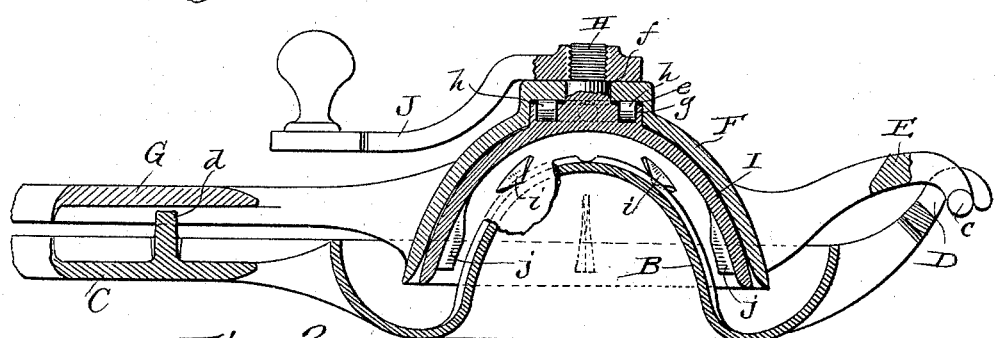
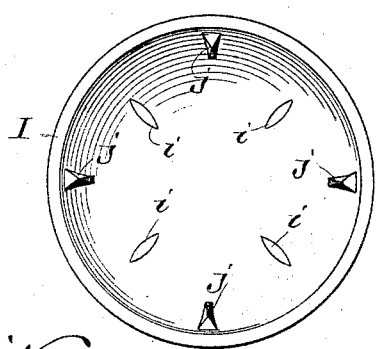
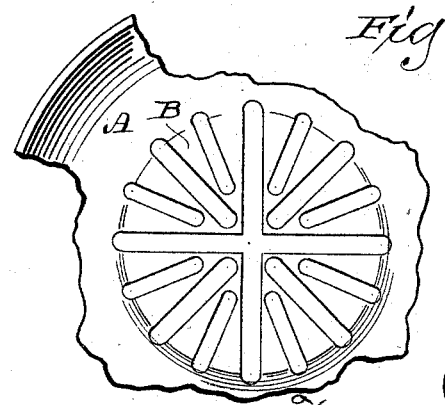
Witnesses
Geo W Young
N. E. Oliphant
Inventor
William Schwendler
By H. G. Underwood.
Attorney

UNITED STATES PATENT OFFICE.

WILLIAM SCHWENDLER, OF MILWAUKEE, WISCONSIN.

LEMON-SQUEEZER.

SPECIFICATION forming part of Letters Patent No. 497,078, dated May 9, 1893.

Application filed May 2, 1892. Serial No. 431,565. (No model.)

*To all whom it may concern:*

Be it known that I, WILLIAM SCHWENDLER, a citizen of the United States, and a resident of Milwaukee, in the county of Milwaukee, and in the State of Wisconsin, have invented certain new and useful Improvements in Lemon-Squeezers; and I do hereby declare that the following is a full, clear, and exact description thereof.

My invention has for its object to provide a simple and convenient lemon-squeezer that may be easily taken apart for the purpose of cleaning, and with which the fruit may be manipulated by mechanical means to rapidly extract all of the juice without expressing any of the essential oil, the latter being in the peel of said fruit and objectionable because of the bitter taste it imparts to said juice when mingled therewith by the action of ordinary squeezers.

My invention therefore consists in certain peculiarities of construction and combination of parts to be hereinafter described with reference to the accompanying drawings and subsequently claimed.

In the drawings: Figure 1 represents a plan-view of a lemon-squeezer constructed according to my invention; Fig. 2, a vertical longitudinal section of the same, on line 2—2 of the preceding figure; Fig. 3, a plan view of the fruit-holder inverted, and Fig. 4, a similar view illustrating a corrugated cone that constitutes part of my device.

Referring by letter to the drawings, A represents a dish-shaped base provided with a central corrugated cone B, a handle C and a bifurcated hook or hinge-joint D, the latter being diametrically opposite the handle. The dish-shaped base A is also preferably provided with spouts $b, b$, diametrically opposite each other and at right-angles to the line of the handle and hinge-joint above described.

The base A, and the parts thus far set forth in connection therewith, constitute the lower section of my lemon-squeezer, and detachably connected to the bifurcated hook or hinge-joint D of the same is the longitudinal shank E and transverse lugs $c$ of a bracket forming part of a conical shell F that has a handle G parallel to the handle C of said base, the latter one of these handles being preferably provided with a transverse rest $d$ for the other, and said conical shell has an internal annular recess $e$ and central opening $f$ in its upper end.

Loosely engaged with the central opening in the upper end of the conical shell F is a stem H projecting outward from the apex of a conical receptacle I arranged within said shell and provided with an annular seat $g$ for a series of balls or rollers $h$ that project into the recess $e$ of the aforesaid shell as shown in Fig. 2. So much of the stem H as extends above the shell F is screw-threaded to detachably engage a tapped opening in the crank J, and by turning this crank rotary motion is imparted to the conical receptacle arranged within said shell.

The receptacle I is provided upon its interior with an upper row of teeth $i$ that breaks joints with a lower row of ribs $j$, and when one-half of a lemon is placed in said receptacle, the teeth and ribs engage the peel to hold the same in place, thereby insuring a rotation of the fruit when the crank J is turned. The ribs $j$ are preferably wedge-shaped and approximately tapering in the direction of their length, and I also prefer to have the lower ends of said ribs horizontal in order to obtain the best possible hold upon the lemon-peel and prevent the latter from falling out when the upper section of the squeezer is raised.

In practice one-half of a lemon being positioned in the receptacle I, the upper section of the squeezer is swung down on its hinge to force the fruit onto the corrugated cone B, the rest $d$ on the handle C serving to limit the movement and prevent forcible contact of said cone with the peel of said fruit. The handles C, G, are now gripped by one hand of the operator and the crank J rotated with the other hand to cause a rotation of the receptacle I and inclosed fruit about the corrugated cone B, whereby the juice of said fruit is thoroughly extracted and collected in the dish-shaped base A of the device.

The balls or rollers $h$ facilitate the rotation of the receptacle I by reducing friction, and the operation of extracting the lemon juice is rapidly effected without any pressure that would be sufficient to express the essential oil in the peel of the fruit. The operation just described having been effected, the upper section of the device is swung up and the peel of the fruit removed from the rotary receptacle by the hand of the operator.

Having now fully described my invention, what I claim as new, and desire to secure by Letters Patent, is—

1. A lemon-squeezer comprising a dish-shaped base provided with a handle and central corrugated cone, a supporting device having a hinge-connection with the base and also provided with a handle, a rotative fruit-receptacle carried with the supporting device in position to surround the cone on said base and provided with an external annular seat at its upper end, and a series of anti-friction rollers arranged in the seat to impinge against said supporting device, substantially as set forth.

2. A lemon-squeezer comprising a dish-shaped base provided with a handle and a central corrugated cone, a shell having a hinge connection with the base and also provided with a handle, a fruit receptacle having a stem loosely engaging an opening in the shell, and a crank fitted to said stem, substantially as set forth.

In testimony that I claim the foregoing I have hereunto set my hand, at Milwaukee, in the county of Milwaukee and State of Wisconsin, in the presence of two witnesses.

WILLIAM SCHWENDLER.

Witnesses:
H. G. UNDERWOOD,
N. E. OLIPHANT.